United States Patent [19]
Klein

[11] Patent Number: 5,646,981
[45] Date of Patent: Jul. 8, 1997

[54] ARRANGEMENT FOR AUTOMATED DELIVERY OF VOICE-MAIL MESSAGES FOR SOFTWARE PROCESSES

[75] Inventor: Robert Michael Klein, Golden, Colo.

[73] Assignee: Lucent Technologies Inc., Murray Hill, N.J.

[21] Appl. No.: 370,925

[22] Filed: Jan. 10, 1995

[51] Int. Cl.$^6$ ................................................ H04M 1/64
[52] U.S. Cl. ................................. 379/67; 379/93.24
[58] Field of Search .......................... 379/67, 88, 89, 379/94, 93, 201; 395/700

[56] References Cited

U.S. PATENT DOCUMENTS

| | | | |
|---|---|---|---|
| 4,790,003 | 12/1988 | Kepley et al. | 379/96 |
| 4,853,952 | 8/1989 | Jachmann et al. | 379/89 |
| 5,113,430 | 5/1992 | Richardson, Jr. et al. | 379/88 |
| 5,406,557 | 4/1995 | Baudoin | 379/94 |

*Primary Examiner*—Fan Tsang
*Attorney, Agent, or Firm*—David Volejnicek

[57] ABSTRACT

A program-implemented arrangement (26) executing on a computer (22) facilitates use of a voice messaging system (VMS 12) by other application programs (25) by interacting with the application program interface (API) of the VMS on behalf of the application programs. In response to an application program writing a message identifier and a destination identifier to a pipe (37), a daemon process (34) of the arrangement retrieves the identified message from its database (33) and causes the VMS to deliver it to the identified destination. Messages to populate the database are generated via the conventional VMS message-creation facility and are brought into the database by a message-retrieval process (32) of the arrangement.

24 Claims, 4 Drawing Sheets

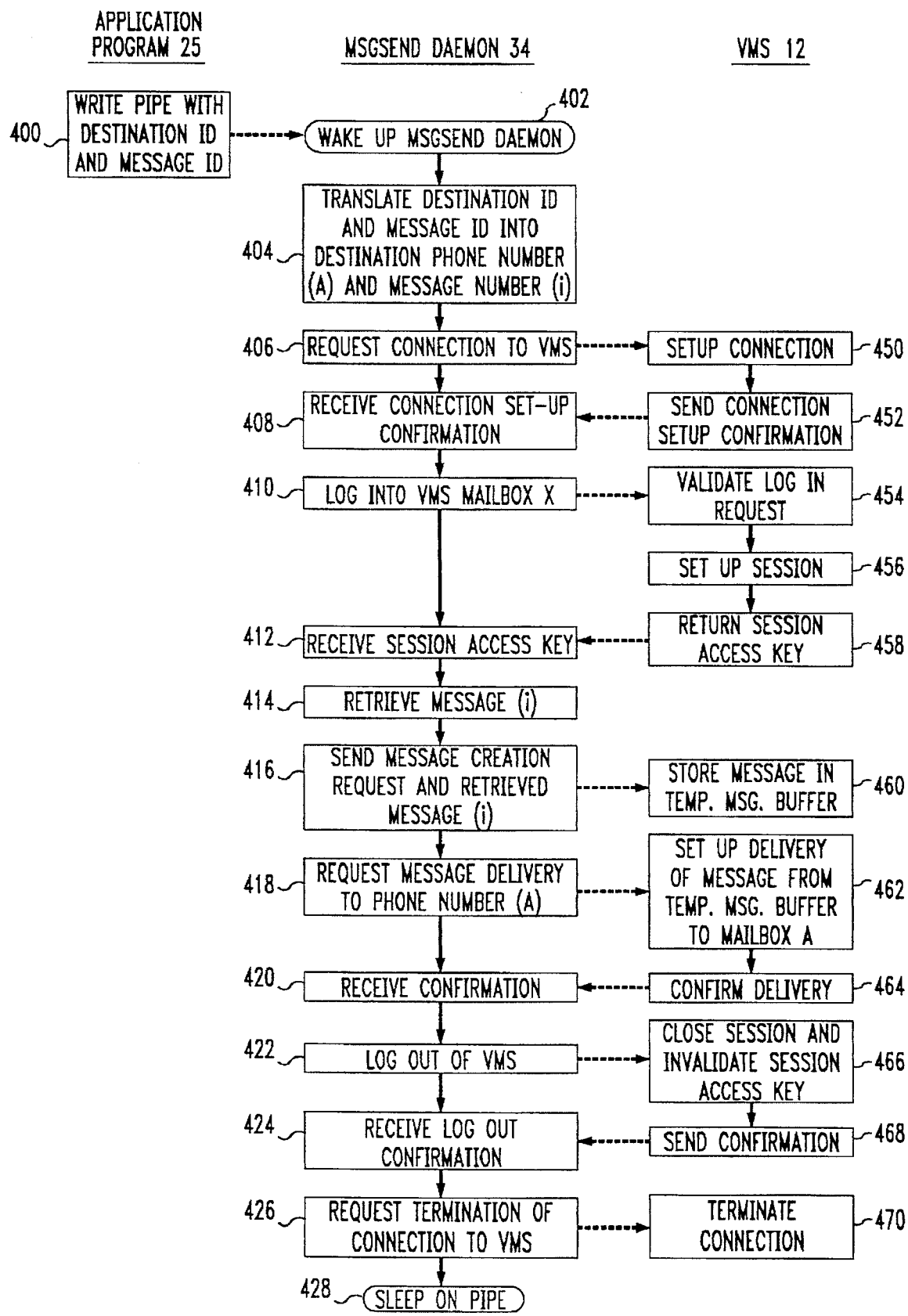

ARRANGEMENT FOR AUTOMATED DELIVERY OF VOICE-MAIL MESSAGES FOR SOFTWARE PROCESSES

TECHNICAL FIELD

This invention relates to telecommunications in general, and to the communications interface between humans and software in particular.

BACKGROUND OF THE INVENTION

The capability of generating and delivering to users voice messages under program control is well known in the art. Examples thereof are voice-mail systems and interactive voice recognition (e.g., programmed conversation) systems. These systems are designed from the start to have the capability of delivering voice messages under program control to persons.

There also exist varieties of software applications (such as source code control systems, database managers, maintenance request tracking systems, CAD/CAM systems, CASE tools, etc.) which may, upon detecting some event or condition (such as a change to a schematic diagram or software component, deletion of a database record, creation of a maintenance request, etc.) wish to deliver a voice-mail message or some other type of message to one or more persons as a way of notifying the persons of the detected event or condition. Conventional application program interfaces (APIs) to messaging systems typically provide functional interfaces that enable software processes to interact with the messaging systems and cause delivery of the desired messages. However, in order to enable the software processes to use the APIs, normally new and non-trivial software must be written for each application which desires to use this service. Furthermore, the APIs normally provide little or no support for the administration and maintenance (e.g., creation, modification, and deletion) of the notification messages. Hence, adaptation of an application to enable it to send mail-system messages to humans is typically a substantial task, and one that must be repeated anew for each application.

SUMMARY OF THE INVENTION

This invention is directed to solving these and other problems and disadvantages of the prior art. Generally according to the invention, there is provided an arrangement that facilitates use of a messaging system—such as a voice-mail system—by application programs, by interacting with the messaging system on behalf of the application programs, so that the application programs can take advantage of the services provided by the messaging system while remaining ignorant of the requirements and interfaces of the messaging system. Specifically according to one aspect of the invention, a telecommunications apparatus comprises a computer for executing an application program, which computer is connectable to a separate audio messaging apparatus that delivers audio messages to destinations, and further comprises an arrangement implemented in a program for execution on the computer. In response to signaling received from the application program and indicative of a first one of a plurality of possible audio messages to be sent to a first one of a plurality of possible destinations, the arrangement interacts with the audio-messaging apparatus on behalf of the application program to cause the audio-messaging apparatus to deliver the first audio message to the first destination. In a corresponding telecommunications method, an application program executing on a computer signals to a program-implemented arrangement an indication of a first one of a plurality of possible audio messages to be sent to a first one of a plurality of possible destinations. In response to receipt of the signaling, the program-implemented arrangement executes on the computer and interacts on behalf of the application program with an audio-messaging apparatus separate from but connected to the computer. Through the interaction, the executing arrangement causes the audio-messaging apparatus to deliver the first audio message to the first destination.

According to another aspect of the invention, the telecommunications apparatus comprises a computer with an operating system for executing an application program, which computer is connectable to a separate messaging apparatus that delivers messages to persons, and further comprises an arrangement implemented in a program for execution on the computer. The program interacts with the operating system. In response to the application program interacting with the operating system in a way that indicates to the program-implemented arrangement a first one of a plurality of possible messages to be sent to a first one of a plurality of persons, the arrangement interacts with the messaging apparatus on behalf of the application program to cause the messaging apparatus to deliver the first message to the first person. In a corresponding telecommunications method, an applications program executing on a computer and interacting with the computer's operating system, interacts with the operating system in a way that indicates to a program-implemented arrangement a first one of a plurality of possible messages to be sent to a first one of a plurality of possible people. In response to the interaction, the program-implemented arrangement executes on the computer and interacts on behalf of the application program with a messaging apparatus separate from but connected to the computer. Through its interaction with the messaging apparatus, the executing arrangement causes the messaging apparatus to deliver the first message to the first person.

Preferably, the program-implemented arrangement comprises a database of the plurality of possible messages, and in response to the signaling from the application program, the first audio message is retrieved from the database and delivered to the audio-messaging apparatus, and the audio-messaging apparatus is caused to deliver that first message to the first destination. The audio messages that populate the database are generated in a mailbox of the audio-messaging apparatus via a message-creation facility of the audio-messaging apparatus, and the program-implemented arrangement causes the audio-messaging apparatus to retrieve the generated audio messages from the mailbox and deliver them to the program-implemented arrangement, whereupon they are stored in the database. A special mechanism for administering (generating) the messages is therefore not needed; rather, the conventional facilities of the audio-messaging apparatus can be used for this function.

These and other advantages and features of the invention will become apparent from the following description of an illustrative embodiment of the invention considered together with the drawing.

BRIEF DESCRIPTION OF THE DRAWING

FIG. 4 is a flow diagram of a message sending procedure of the system of FIG. 1.

DETAILED DESCRIPTION

Figure 1:
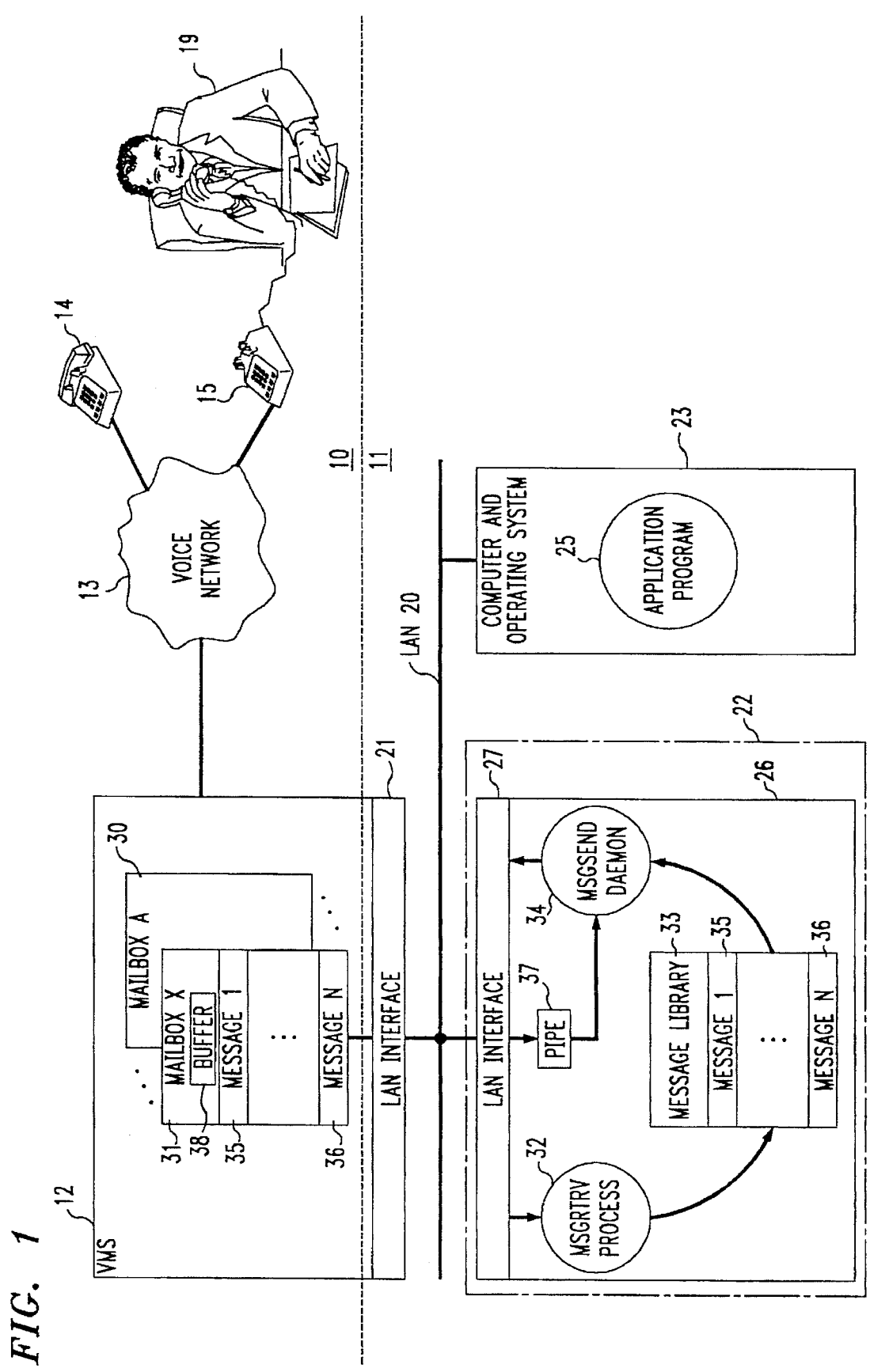
FIG. 1 is a block diagram of an exemplary telecommunications system that includes an illustrative embodiment of the invention.

FIG. 1 shows an illustrative telecommunications system comprising two subsystems: a subsystem 10, which may be a multi-media communications subsystem and includes a voice communications capability, and a subsystem 11, which may also be a multi-media communications system and includes a data communications capability.

Subsystem 10 includes a conventional voice-messaging system 12, such as an AT&T AUDIX® or Intuity® VMS, which is interconnected with a plurality of voice terminals 14–15, such as conventional telephone sets, by a voice network 13, such as a conventional private branch exchange (PBX) or the public telephone network, for purposes of delivering voice messages to persons at voice terminals 14–15. Subsystem 11 includes a conventional local area network (LAN) 20 or some other data communications medium, a conventional LAN interface 21 in VMS 12 that connects VMS 12 to LAN 20 for data communications, and one or more computers 22—23 (hereafter jointly and severally referred to in the singular) that execute an operating system and that are also connected to LAN 20. The operating system is conventional, such as the UNIX® operating system. Together, a computer and operating system provide a platform for the execution of application programs, as is conventional.

LAN interface 21 typically includes a conventional application program interface (API) that is either an open or a proprietary interface. As is well known in the art, an API is a set of software calls and data formats that programs use to initiate contact with, and obtain services from, other programs, shared system resources, or network servers. The API of LAN interface 21 opens VMS 12 for use by external programs by configuring VMS 12 as a server in a network programming environment, based on standard LAN technology. Hence, external application programs 25 can be written which have access to VMS mailboxes 30–31 via LAN 20, and voice messaging can be integrated with application programs 25. Application programs 25 execute on one or more computers 22–23 under the control of the operating system, in a conventional manner. Application programs 25 interact with the operating system in a conventional manner to obtain therefrom computer-platform services, as is conventional.

According to the invention, there is provided an arrangement 26 which facilitates the use by application programs 25 of VMS 12. It interacts with VMS 12 through the API on behalf of application programs 25, so that application programs 25 can take advantage of the messaging capabilities of VMS 12 while remaining ignorant of its requirements and interfaces. Arrangement 26 is implemented in software that is stored in a memory and executed on a CPU of computer 22. It is interfaced to LAN 20, and therethrough to interface 21 of VMS 12 and to application programs 25 executing on other computers 23, via a LAN interface 27 of conventional design. Arrangement 26 comprises a message library 33, such as a conventional database that may be as simple as a set of files in a directory, of pre-recorded audio or multi-media messages 35–36, a MSGRTRV process 32 that facilitates the population of library 33 with messages 35–36, a MSGSEND daemon process 34 which causes delivery of selected messages 35–36 to selected mailboxes 30–31 of VMS 12 on behalf of application programs 25, and a conventional UNIX® system pipe 37 by means of which application programs 25 trigger daemon process 34 to effect message delivery on their behalf. A daemon is a server process that runs in the background, waiting for a service request to be made by an application, and thereafter effects the service. As a part of effecting the service, the daemon may function as a client of another server. A pipe is a conventional operating system mechanism that allows a stream of data to be passed between reader and writer processes. An extensive discussion of pipes may be found, for example, in M. J. Bach, *The Design of the UNIX® Operating System*, Prentice-Hall, Inc., 1986.

Figure 2:
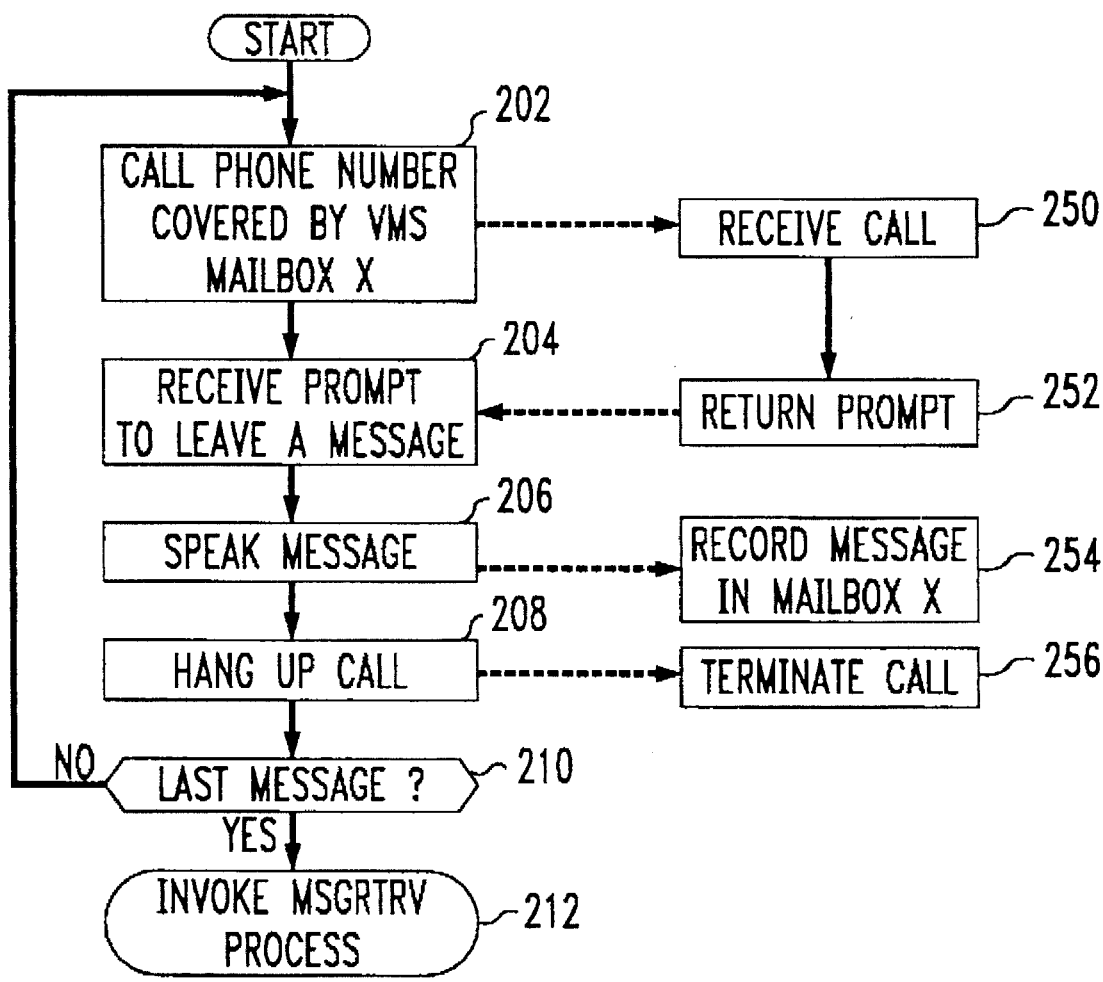
FIG. 2 is a flow diagram of a message creation procedure of the system of FIG. 1.

MSGRTRV process 32 enables messages 35–36 that populate message library 33 to be created by means of the conventional VMS 12 message-creation mechanism. This mechanism is functionally illustrated in FIG. 2. To create a message 35–36, an administrator 19 places a call via a voice terminal 15 to a telephone number of voice network 13 that has its call-coverage feature activated and is covered by a mailbox 31 of VMS 12, at step 202. VMS 12 receives the call, at step 250, and prompts the caller to leave a message, in the conventional manner, at step 252. Administrator 19 receives the prompt, at step 204, and speaks the message into voice terminal 15, at step 206. VMS 12 receives the spoken message and records it in digital form into mailbox 31, at step 254, again in the conventional manner. Having recorded the message, administrator 19 hangs up the call at voice terminal 15, at step 208. VMS 12 detects the hanging up and terminates the call, at step 256. If all desired messages have not been recorded, as determined at step 210, to create a next message 35–36, administrator 19 repeats the process by returning to step 202. After recording all messages 35–36 in mailbox 31, administrator 19 invokes execution of MSGRTRV process 32 on computer 22, at step 212.

Figure 3:
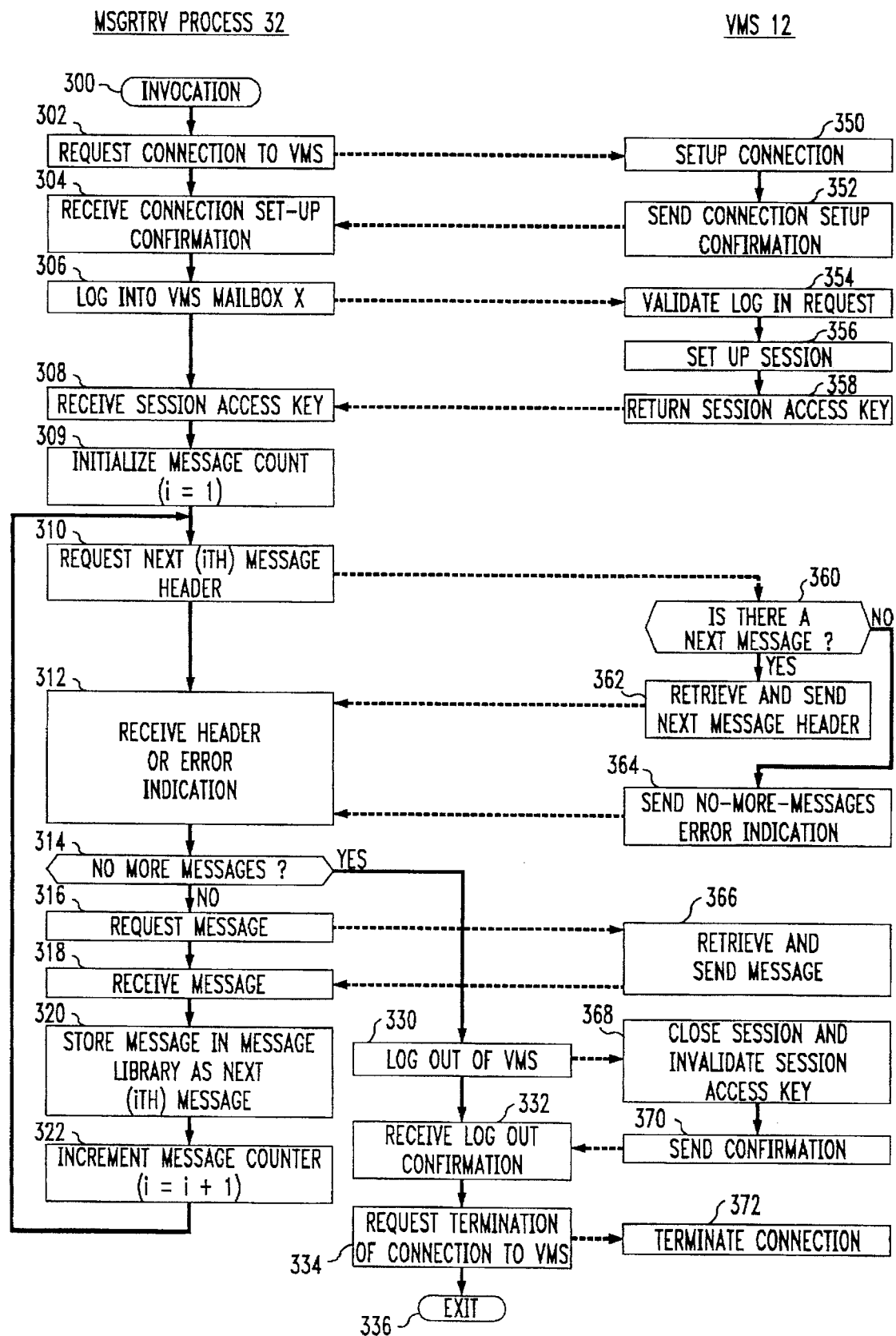
FIG. 3 is a flow diagram of a message retrieval procedure of the system of FIG. 1.

MSGRTRV process 32 is illustrated in FIG. 3. Upon being invoked, at step 300, it requests a TCP/IP connection to VMS 12 from LAN interface 27, at step 302. LAN interfaces 27 and 21 cooperate to set up the connection, at step 350, and return a confirmation when it has been set up, at step 352. When it receives the confirmation from LAN interface 21 through LAN interface 27, at step 304, process 32 logs into VMS 12 using the telephone number to which mailbox 31 corresponds and a password that has been assigned to mailbox 31, as a login and a password, respectively, at step 306. VMS 12 validates the login information, at step 354, sets up an individual communications session with VMS 12 in the API of LAN interface 21, at step 356, and returns to process 32 an access key that uniquely identifies the session and distinguishes it from other co-temporaneous sessions, at step 358. Process 32 receives the session access key, at step 308, and uses it in subsequent communications with VMS 12 to associate the communications with this session.

Process 32 then initializes a message counter (i) to a first message, at step 309, and uses it to request the header of the next (here, the first) message in mailbox 31 from VMS 12, at step 310. VMS 12 checks whether there is a next message in mailbox 31, at step 360. If there is another message in mailbox 31, VMS 12 retrieves the header of the next message and sends it to process 32, at step 362. If there are no more messages in mailbox 31, VMS 12 sends back a no-more-messages error indication, at step 364. Process 32 receives the message header or error indication from VMS 12, at step 312. If it received a header of a next message, as determined at step 314, process 32 requests the message from VMS 12, at step 316. VMS 12 responds by retrieving the audio file of the message body and sending it to process 32, at step 316. Upon receiving the message file, at step 318, process 32 stores it in message library 33 under the present value of the message counter (i), at step 320. Process 32 then increments the value of the message counter (i), at step 322, and returns to step 310 to retrieve the next message, if any. Hence, the first message 35 from mailbox 31 gets stored as the first message 35 of message library 33, the second message from mailbox 31 gets stored as the second message of message library 33, etc.

After the last message 36 of mailbox 31 has been stored in message library 33, the request by process 32 for the next message header results in VMS 12 returning the no-more-messages error indication to process 32, at step 364. When this is determined by process 32, at step 314, it signifies that all messages 35–36 have been retrieved from mailbox 31 and stored in message library 33. Process 32 therefore logs out of VMS 12, at step 330. VMS 12 responds by closing the corresponding session and invalidating its access key, at step 368, and sending a confirmation to process 32, at step 370. Upon receiving the confirmation, at step 332, process 32 causes LAN interface 27 to terminate the TCP/IP connection across LAN 20 to VMS 12, at step 334. LAN interfaces 37 and 21 cooperate to terminate the connection as requested, at step 372. The job of process 32 is thus completed, and it exits execution, at step 336.

Now that message library 33 has been populated with messages 35–36, arrangement 26 is ready for use by application programs 25. This use is illustrated in FIG. 4.

When an application program 25 wishes to send a voice message to a particular destination, it merely writes a destination identifier (ID) and a message ID to pipe 37 through the operating system, in a conventional manner, at step 400. Such functionality is well within the conventional capability of conventional operating systems and programs. Hence, the application program 25 need have no knowledge of voice communication mechanisms and procedures in order to be able to send a voice message; all it has to be able to do is to to perform a write operation in its operating system environment.

MSGSEND daemon 34 is asleep on pipe 37, in a conventional manner. The writing of pipe 37 results in daemon 34 being awakened, at step 402. Daemon 34 receives the destination and message ID as written by application program 25 and, if necessary, it translates the IDs into a destination phone number and a message number, at step 404. The need for the translation is eliminated if the received IDs are the phone and message numbers themselves. Daemon 34 then requests a TCP/IP connection to VMS 12 from LAN interface 27, at step 406. LAN interfaces 27 and 21 cooperate to set up the connection, at step 450, and return a confirmation when it has been set up, at step 452. When it receives the confirmation of the connection from LAN interface 21 via LAN interface 27, at step 408, daemon 34 logs into mailbox 31 of VMS 12, at step 410, in the same manner as MSGRTRV process 32 did at step 306 of FIG. 3. VMS 12 again validates the login information, at step 454, sets up an individual communications session with VMS 12 in the API of LAN interface 21, at step 456, and returns to daemon 34 an access key that uniquely identifies the session and distinguishes it from other co-temporaneous sessions, at step 458. Daemon 34 receives the session access key from VMS 12, at step 412, for use in further communications with VMS 12. Daemon 34 then retrieves from message library 33 the audio file of the message that application program 25 wishes to have sent, at step 414, and sends the retrieved message's audio file along with a message creation request to VMS 12, at step 416. VMS 12 responds by creating a new message in a temporary message buffer 38 in mailbox 31 by storing the received message audio file in the temporary message buffer 38, at step 460. Daemon 34 also requests VMS 12 to deliver this message to the destination phone number identified by application program 25, at step 418. VMS 12 sets up delivery of the message to mailbox 30 that corresponds to that phone number, at step 462, and sends a confirmation to daemon 34, at step 464. Upon receiving the confirmation, at step 420, daemon 34 logs out of VMS 12, at step 422. VMS 12 responds by closing the corresponding session and invalidating its access key, at step 466, and sending a confirmation to daemon 34, at step 468. Upon receiving the confirmation, at step 424, daemon 34 requests LAN interface 27 to terminate the connection across LAN 20 to VMS 12, at step 426. LAN interfaces 27 and 21 cooperate to terminate the connection as requested, at step 470. Its task is now completed, and daemon 34 returns to sleep on pipe 37, at step 428.

Of course, various changes and modifications to the illustrative embodiment described above will be apparent to those skilled in the art. For example, instead of sharing use of the MSGSEND daemon and/or message library, each application program may have its own corresponding daemon and/or its own corresponding message library. Alternatively, the application programs may share use of a plurality of message libraries, and specify in each message-send request the one library from which the message is to be obtained. The message library or libraries need not be co-resident with the MSGSEND daemon, but rather may reside on another computer. Conversely, all of the data communication subsystem's program entities, including all application programs, may be co-resident with the MSGSEND daemon and message library on a single computer. Also, more than one VMS may be used, with the particular VMS being specified as a parameter of the original request. Furthermore, the messaging system need not be a voice messaging system, but instead it may be a system that delivers messages in another medium or even in multiple media. Messages may also be sent to recipients who are not messaging system subscribers, for example, through the call-delivery mechanism of the VMS. Furthermore, a MSGRECEIVE daemon process may be added, to enable application programs to receive messages in a manner analogous to how they send messages, and even to specify the desired source (originator) of the received message. Such changes and modifications can be made without departing from the spirit and the scope of the invention and without diminishing its attendant advantages. It is therefore intended that such changes and modifications be covered by the following claims.

I claim:

1. A telecommunications apparatus comprising:

a messaging apparatus for delivering messages to persons;

a computer separate from but connected to the messaging apparatus and executing an operating system;

a plurality of application programs executing on the computer and interacting with the operating system; and a program-implemented arrangement executing on the computer independently of the application programs, including a database of a plurality of messages and responsive to an interaction, of any application program of the application programs with the operating system, that indicates, to the program-implemented arrangement, a first one of the plurality of messages to be sent to a first one of a plurality of persons, for retrieving the first message from the database and delivering the first message to the messaging apparatus and causing the messaging apparatus to deliver the first message to the first person, without involvement of the application programs.

2. The telecommunications apparatus of claim 1 wherein:

the application program interacts with the operating system to write predetermined information to a predetermined place in the computer, as a way of indicating to the program-implemented arrangement.

3. The telecommunications apparatus of claim 1 wherein:

the application program interacts with the operating system to write a predetermined operating system pipe, as a way of indicating to the program-implemented arrangement.

4. A telecommunications apparatus comprising:

a computer with an operating system, for executing a plurality of application programs that interact with the operating system during execution, the computer being connectable to a separate messaging apparatus for delivering messages to persons; and an arrangement implemented in a program for execution on the computer independently of the application programs, including a database of a plurality of messages and responsive to an interaction, of any application program of the application programs with the operating system, that indicates, to the program-implemented arrangement, a first one of the plurality of messages to be sent to a first one of a plurality of persons, for retrieving the first message from the database and delivering the first message to a connected said messaging apparatus and causing the messaging apparatus to deliver the first message to the first person, without involvement of the application programs.

5. The telecommunications apparatus of claim 4 wherein:

the application program interacts with the operating system to write predetermined information to a predetermined place in the computer, as a way of indicating to the program-implemented arrangement.

6. The telecommunications apparatus of claim 4 wherein:

the application program interacts with the operating system to write a predetermined operating system pipe, as a way of indicating to the program-implemented arrangement.

7. A telecommunications method comprising the steps of:

interacting, by any application program of a plurality of application programs executing on a computer, with an operating system of the computer, to indicate to a program-implemented arrangement a first one of a plurality of messages to be sent to a first one of a plurality of persons;

in response to the interacting, the program-implemented arrangement executing on the computer independently of the application programs and retrieving the first message from a database of the plurality of messages, without involvement of the application programs;

in response to the retrieving, delivering the first message to a messaging apparatus separate from but connected to the computer, without involvement of the application programs;

causing the messaging apparatus to deliver the first message to the first person, without involvement of the application programs; and in response to the causing, the messaging apparatus delivering the first message to the first person.

8. The telecommunications method of claim 7 wherein:

the step of interacting with an operating system comprises the step of the application program interacting with the operating system to write predetermined information to a predetermined place in the computer, as a way of indicating to the program-implemented arrangement.

9. The telecommunications method of claim 7 wherein:

the step of interacting with an operating system comprises the step of the application program interacting with the operating system to write a predetermined operating system pipe, as a way of indicating to the program-implemented arrangement.

10. A telecommunications apparatus comprising:

an audio-messaging apparatus for delivering messages to destinations;

a computer separate from but connected to the audio-messaging apparatus;

a plurality of application programs executing on the computer; and a program-implemented arrangement executing on the computer independently of the application programs, comprising a database of a plurality of audio messages and responsive to signaling received from any application program of the application programs and indicative of a first one of the plurality of audio messages to be sent to a first one of a plurality of destinations, for retrieving the first audio message from the database and delivering the first audio message to the audio-messaging apparatus on behalf of the application program and causing the audio-messaging apparatus to deliver the first audio message to the first destination, without involvement of the application programs.

11. The telecommunications apparatus of claim 10 wherein:

the application program signals to the program-implemented arrangement by writing predetermined information to a predetermined place in the computer.

12. The telecommunications apparatus of claim 10 wherein:

the application program signals to the program-implemented arrangement by writing a predetermined operating system pipe.

13. A telecommunications apparatus comprising:

a computer for executing a plurality of application programs, the computer being connectable to a separate audio-messaging apparatus for delivering audio messages to destinations; and an arrangement implemented in a program for execution on the computer independently of the application programs, including a database of a plurality of audio messages and responsive to signaling received from any application program of the application programs and indicative of a first one of the plurality of audio messages to be sent to a first one of a plurality of destinations, for retrieving the first audio message from the database and delivering the first audio message to a connected said audio-messaging apparatus on behalf of the application program and causing the audio-messaging apparatus to deliver the first audio message to the first destination, without involvement of the application programs.

14. The telecommunications apparatus of claim 13 wherein:

the application program signals to the program-implemented arrangement by writing predetermined information to a predetermined place in the computer.

15. The telecommunications apparatus of claim 13 wherein:

the application program signals to the program-implemented arrangement by writing a predetermined operating system pipe.

16. A telecommunications method comprising the steps of:

signaling, from any application program of a plurality of application programs executing on a computer to a program-implemented arrangement, an indication of a first one of a plurality of audio messages to be sent to a first one of a plurality of destinations;

in response to receipt of the signaling, the program-implemented arrangement executing on the computer independently of the application programs and retrieving the first audio message from a database of the plurality of audio messages that is included in the program-implemented arrangement, without involvement of the application programs;

in response to the retrieving, delivering the first audio message on behalf of the application program to an audio-messaging apparatus separate from but connected to the computer, without involvement of the application programs;

causing the audio-messaging apparatus to deliver the first audio message to the first destination, without involvement of the application programs; and in response to the causing, the audio-messaging apparatus delivering the first audio message to the first destination.

17. The telecommunications method of claim 16 wherein:

the step of signaling comprises the step of the application program writing predetermined information to a predetermined place in the computer to signal the program-implemented arrangement.

18. The telecommunications method of claim 16 wherein:

the step of signaling comprises the step of the application program writing a predetermined operating system pipe to signal the program-implemented arrangement.

19. A telecommunications apparatus comprising:

a messaging apparatus for delivering messages to persons;

a computer separate from but connected to the messaging apparatus and executing an operating system;

an application program executing on the computer and interacting with the operating system;

a program-implemented arrangement executing on the computer, including a database of a plurality of messages and responsive to an interaction, of the application program with the operating system, that indicates, to the program-implemented arrangement, a first one of the plurality of messages to be sent to a first one of a plurality of persons, for retrieving the first message from the database, delivering the first message to the messaging apparatus, and causing the messaging apparatus to deliver the first message to the first person; and means for causing the messaging apparatus to retrieve a message from a mailbox of the messaging apparatus and deliver the retrieved message to the means, and storing the delivered retrieved message in the database as one of the messages, so that the plurality of messages in the database may be generated via a message-creation facility of the messaging apparatus.

20. A telecommunications apparatus comprising:

a computer with an operating system, for executing an application program that interacts with the operating system during execution, the computer being connectable to a separate messaging apparatus for delivering messages to persons;

an arrangement implemented in a program for execution on the computer, including a database of a plurality of messages and responsive to an interaction, of the application program with the operating system, that indicates, to the program-implemented arrangement, a first one of the plurality of messages to be sent to a first one of a plurality of persons, for retrieving the first message from the database, delivering the first message to a connected said messaging apparatus, and causing the messaging apparatus to deliver the first message to the first person; and means for causing the messaging apparatus to retrieve a message from a mailbox of the messaging apparatus and deliver the retrieved message to the means, and storing the delivered retrieved message in the database as one of the messages, so that the plurality of messages may be generated via a message-creation facility of the messaging apparatus.

21. A telecommunications method comprising the steps of:

interacting, by an application program executing on a computer, with an operating system of the computer, to indicate to a program-implemented arrangement a first one of a plurality of messages to be sent to a first one of a plurality of persons;

in response to the interacting, the program-implemented arrangement executing on the computer and retrieving the first message from a database of the plurality of messages;

in response to the retrieving, delivering the first message to a messaging apparatus separate from but connected to the computer;

causing the messaging apparatus to deliver the first message to the first person;

in response to the causing, the messaging apparatus delivering the first message to the first person;

generating a message in a mailbox of the messaging apparatus via a message-creation facility of the messaging apparatus;

the program-implemented arrangement causing the messaging apparatus to retrieve the generated message from the mailbox and deliver the retrieved message to the program-implemented arrangement; and storing the delivered retrieved message in the database as one of the messages.

22. A telecommunications apparatus comprising:

an audio-messaging apparatus for delivering messages to destinations;

a computer separate from but connected to the audio-messaging apparatus;

an application program executing on the computer;

a program-implemented arrangement executing on the computer, comprising a database of a plurality of audio messages and responsive to signaling received from the application program and indicative of a first one of the plurality of audio messages to be sent to a first one of a plurality of destinations, for retrieving the first audio message from the database, delivering the first audio message to the audio-messaging apparatus on behalf of the application program, and causing the audio-messaging apparatus to deliver the first audio message to the first destination; and means for causing the audio-messaging apparatus to retrieve an audio message from a mailbox of the audio-messaging apparatus and deliver the retrieved audio message to the means, and storing the delivered retrieved audio message in the database as one of the messages, so that the plurality of audio messages in the database may be generated via a message-creation facility of the audio-messaging apparatus.

23. A telecommunications apparatus comprising:

a computer for executing an application program, the computer being connectable to a separate audio-messaging apparatus for delivering audio messages to destinations;

an arrangement implemented in a program for execution on the computer, including a database of a plurality of audio messages and responsive to signaling received from the application program and indicative of a first one of the plurality of audio messages to be sent to a first one of a plurality of destinations, for retrieving the first audio message from the database, delivering the first audio message to a connected said audio-messaging apparatus on behalf of the application program, and causing the audio-messaging apparatus to deliver the first audio message to the first destination; and means for causing the audio-messaging apparatus to retrieve an audio message from a mailbox of the audio-messaging apparatus and deliver the retrieved audio message to the means, and storing the delivered retrieved audio message in the database as one of the messages, so that the plurality of audio messages may be generated via a message-creation facility of the audio-messaging apparatus.

24. A telecommunications method comprising the steps of:

signaling, from an application program executing on a computer to a program-implemented arrangement, an indication of a first one of a plurality of audio messages to be sent to a first one of a plurality of destinations;

in response to receipt of the signaling, the program-implemented arrangement executing on the computer and retrieving the first audio message from a database of the plurality of audio messages that is included in the program-implemented arrangement;

in response to the retrieving, delivering the first audio message on behalf of the application program to an audio-messaging apparatus separate from but connected to the computer;

causing the audio-messaging apparatus to deliver the first audio message to the first destination;

in response to the causing, the audio-messaging apparatus delivering the first audio message to the first destination;

generating an audio message in a mailbox of the audio-messaging apparatus via a message-creation facility of the audio-messaging apparatus;

the program-implemented arrangement causing the audio-messaging apparatus to retrieve the generated audio message from the mailbox and deliver the retrieved audio message to the program-implemented arrangement; and storing the delivered retrieved audio message in the database as one of the messages.

* * * * *